United States Patent
Park et al.

(10) Patent No.: US 9,241,291 B2
(45) Date of Patent: Jan. 19, 2016

(54) METHOD FOR REDUCING HANDOVER INTERRUPTION TIME IN TERMINAL

(75) Inventors: Kyu Jin Park, Gyeonggi-do (KR); Doo Hyun Sung, Gyeonggi-do (KR); Hyun Woo Lee, Gyeonggi-do (KR); Han Gyu Cho, Gyeonggi-do (KR); Eun Jong Lee, Gyeonggi-do (KR); Yeong Hyeon Kwon, Gyeonggi-do (KR); Jae Hoon Chung, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 773 days.

(21) Appl. No.: 12/920,436

(22) PCT Filed: May 14, 2009

(86) PCT No.: PCT/KR2009/002560
§ 371 (c)(1),
(2), (4) Date: Aug. 31, 2010

(87) PCT Pub. No.: WO2009/157650
PCT Pub. Date: Dec. 30, 2009

(65) Prior Publication Data
US 2011/0013595 A1    Jan. 20, 2011

Related U.S. Application Data

(60) Provisional application No. 61/074,994, filed on Jun. 23, 2008, provisional application No. 61/075,740, filed on Jun. 25, 2008, provisional application No. 61/078,448, filed on Jul. 7, 2008.

(30) Foreign Application Priority Data

Mar. 11, 2009    (KR) .................. 10-2009-0020752

(51) Int. Cl.
*H04W 36/00*    (2009.01)
*H04W 28/06*    (2009.01)
(Continued)

(52) U.S. Cl.
CPC .......... *H04W 36/0077* (2013.01); *H04W 28/06* (2013.01); *H04W 48/08* (2013.01); *H04W 48/16* (2013.01); *H04W 72/0466* (2013.01)

(58) Field of Classification Search
CPC ........................ H04W 36/36; H04W 36/0077
USPC .................................. 370/331; 455/436–444
See application file for complete search history.

(56) References Cited

U.S. PATENT DOCUMENTS 6,138,020 A       10/2000  Galyas et al.
2005/0282562 A1*  12/2005  Lee et al. ...................... 455/458

(Continued)

FOREIGN PATENT DOCUMENTS

CN    1846376    10/2006
CN    1870818    11/2006
(Continued)

OTHER PUBLICATIONS

Park et al., "Dedicated Code Based HO Ranging for 802.16m," IEEE 802.16 Broadband Wireless Access Working Group, IEEE C802.16m-08/797, Jul. 2008.

(Continued)

*Primary Examiner* — Hassan Kizou
*Assistant Examiner* — Ashil Farahmand
(74) *Attorney, Agent, or Firm* — Lee, Hong, Degerman, Kang & Waimey

(57) ABSTRACT

A method for reducing handover interruption time in a mobile station is disclosed, in which a mobile station performs a ranging procedure using a dedicated ranging code previously allocated from a target base station. The dedicated ranging code allocated by the target base station may be provided through the serving base station, or may directly be provided from the target base station.

2 Claims, 10 Drawing Sheets

(51) Int. Cl.
 *H04W 48/08* (2009.01)
 *H04W 48/16* (2009.01)
 *H04W 72/04* (2009.01)

(56) References Cited

U.S. PATENT DOCUMENTS

2006/0079235 A1* 4/2006 Kim ............................... 455/439
2008/0161000 A1* 7/2008 Li et al. ......................... 455/436
2009/0109923 A1* 4/2009 Kojima ......................... 370/331

FOREIGN PATENT DOCUMENTS

| CN | 101193398 | 6/2008 |
| KR | 10-2006-0032466 | 4/2006 |
| WO | 2007-147703 | 12/2007 |

OTHER PUBLICATIONS

Kim et al., "SDL Design and Performance Evaluation of a Mobility Management Technique for 3GPP LTE Systems," Lecture Notes in Computer Science—Proceedings of the 13th International SDL Forum Conference on Design for Dependable Systems, vol. 4745, pp. 272-288, Sep. 2007.

In the Intellectual Property Office of China Application Serial No. 200980105289.0, Office Action dated Nov. 5, 2012, 8 pages.

* cited by examiner

METHOD FOR REDUCING HANDOVER INTERRUPTION TIME IN TERMINAL

CROSS-REFERENCE TO RELATED APPLICATIONS

This application is the National Stage filing under 35 U.S.C. §371 of International Application No. PCT/KR2009/002560, filed on May 14, 2009, which, pursuant to 35 U.S.C. §19(a) claims the benefit of earlier filing date and right of priority to Korean Application No. 10-2009-0020752, filed on Mar. 11, 2009, and also, pursuant to 35 U.S.C. §120, claims the benefit of U.S. Provisional Application Ser. Nos. 61/074,994, filed on Jun. 23, 2008, 61/075,740, filed on Jun. 25, 2008, and 61/078,448, filed on Jul. 7, 2008.

TECHNICAL FIELD

The present invention relates to a handover method, and more particularly, to a method for reducing handover interruption time during handover.

BACKGROUND ART

Generally, handover means that communication which is being performed is maintained as it is when a mobile station goes out of a base station and enters another base station. In other words, handover means that exchange of channel or line is performed to maintain call which is being performed.

Handover can be divided into softer handover, soft handover, and hard handover.

In more detail, softer handover is handover performed within one cell, and means that a mobile station converts a current channel of channels used within cell coverage to an excellent channel. Soft handover means that, if a mobile station intends to convert one channel to another channel, the mobile station tries connection to another channel in a state that connection with one channel is maintained, and finally disconnects connection with one channel. Hard handover means that a mobile station disconnects a current channel in which communication is being performed and directly connects another channel.

The mobile station performs a ranging procedure after performing the aforementioned handover procedure.

Ranging means a set of processes for maintaining connection quality (particularly, synchronization) of RF communication between a base station and a mobile station in IEEE 802.16 or mobile Internet. Particularly, during OFDMA/TDD based multiple access, since a base station transmits data to several mobile stations based on one reference timing in a downlink, there is no problem in the downlink. However, since several mobile stations respectively transmit a signal in an uplink, radio wave delay may occur differently for each of the mobile stations. In this respect, as a separate timing synchronization method, a ranging procedure is performed between the base station and the mobile station. Namely, ranging is a procedure for exactly controlling synchronization of transmission time in several mobile stations.

Hereinafter, a ranging procedure will be described with reference to FIG. 1a to FIG. 2b.

In case of a general ranging procedure illustrated in FIG. 1a, a mobile station (MS) transmits a desired random ranging code to a target base station (TBS) (S13), and receives a ranging response message from the target base station if the transmitted ranging code is effective (S14).

However, as illustrated in FIG. 1b, if a plurality of mobile stations request one target base station to allocate the same ranging code, collision of the ranging codes may occur among the plurality of mobile stations (S13). In this case, since the ranging procedure should be retried after the lapse of a certain time period, handover interruption time may increase rapidly.

In addition, in case of a fast ranging procedure illustrated in FIG. 2a, the mobile station (MS) is allocated with an uplink resource from the target base station (TBS) through Fast_Ranging_IE (Information Element) included in an uplink map message (S22). Accordingly, the mobile station can transmit a ranging request RNG_REQ message to the target base station (S23) and receive a ranging response RNG_RSP message from the target base station (S24).

However, as illustrated in FIG. 2b, the target base station may fail to receive the ranging request message RNG_REQ (S23), or the mobile station may fail to receive the ranging response message RNG_RSP. In this case, since the ranging procedure should retried after the lapse of a certain time period and also the general ranging procedure not the fast ranging procedure should be retried, handover interruption time increases.

Accordingly, in order to complete the ranging procedure within the maximum handover interruption time which is previously designated, it is necessary to reduce the handover interruption time caused by either collision of the ranging codes among the plurality of mobile stations or failure in receiving the RNG_REQ/RNG_RNP messages.

DETAILED DESCRIPTION OF THE INVENTION

Technical Problems

Accordingly, the present invention is directed to a method for reducing handover interruption time during handover, which substantially obviates one or more problems due to limitations and disadvantages of the related art.

An object of the present invention is to provide a method for reducing handover interruption time during handover, in which a mobile station promptly performs a ranging procedure using a dedicated ranging code previously allocated from a target base station.

Another object of the present invention is to provide a method for reducing handover interruption time during handover, in which a mobile station is allocated with a dedicated ranging code from a target base station to avoid collision of ranging codes with another mobile station.

Technical Solutions

To achieve the object and other advantages and in accordance with the purpose of the invention, as embodied and broadly described herein, a method for reducing handover interruption time in a mobile station comprises a receiving step of receiving a message, which includes a dedicated ranging code of each of at least one candidate base station, from a serving base station; a first transmitting step of transmitting a message indicating that a candidate base station is determined as a target base station to the serving base station, the candidate base station being a base station which has allocated a specific dedicated ranging code of the dedicated ranging codes included in the received message; and a second transmitting step of transmitting the specific dedicated ranging code to the target base station during a ranging procedure with the target base station.

In another aspect of the present invention, a method for reducing handover interruption time in a mobile station comprises a first receiving step of receiving a message indicating at least one candidate base station from a serving base station; a first transmitting step of transmitting a message indicating that a specific candidate base station of the at least one candidate base station is determined as a target base station to the serving base station; a second receiving step of receiving a message, which includes a specific dedicated ranging code allocated by the target base station, from the serving base station; and a second transmitting step of transmitting the specific dedicated ranging code to the target base station during a ranging procedure with the target base station.

In other aspect of the present invention, a method for reducing handover interruption time in a mobile station comprises a first receiving step of receiving a message indicating at least one candidate base station from a serving base station; a first transmitting step of transmitting a message indicating that a specific candidate base station of the at least one candidate base station is determined as a target base station to the serving base station; a second receiving step of receiving a message, which includes a dedicated ranging code allocated by the target base station, from the serving base station during a ranging procedure with the target base station; and a second transmitting step of transmitting the dedicated ranging code included in the received message to the target base station.

Advantageous Effects

As described above, the method for reducing handover interruption time in a mobile station according to the embodiment of the present invention has the following advantages.

First of all, since the mobile station performs a ranging procedure using a dedicated ranging code allocated from the target base station, a collision problem of the ranging codes with another mobile station does not occur.

In addition, since the collision problem of the ranging codes with another mobile station does not occur, the handover interruption time can be reduced. Accordingly, the mobile station can promptly perform the handover ranging procedure within the handover interruption time which is previously designated.

BEST MODE FOR CARRYING OUT THE INVENTION

Figure 1A:
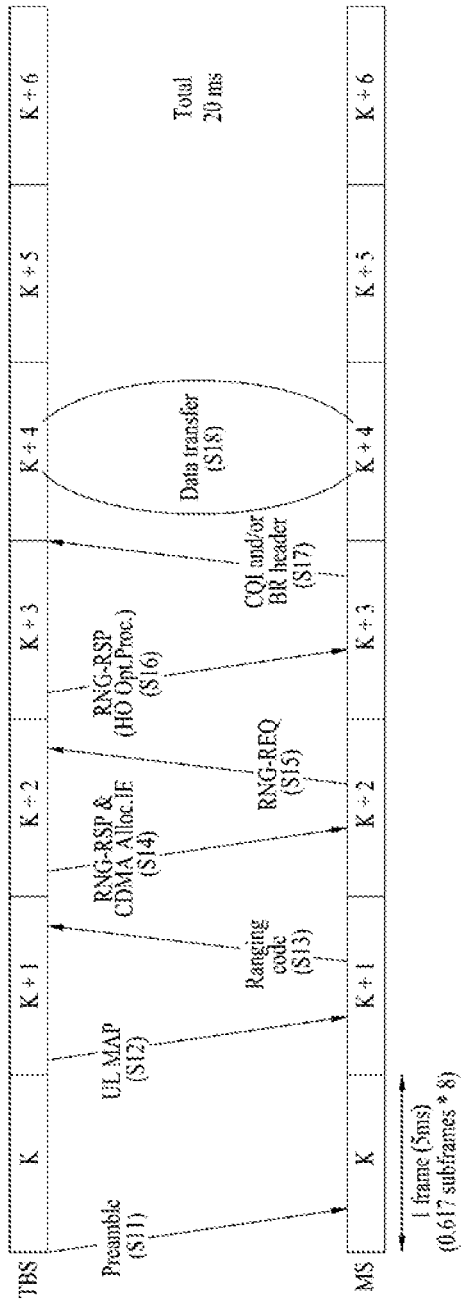
FIG. 1a and FIG. 1b are diagrams illustrating a ranging procedure during general handover according to the related art.
Figure 1B:
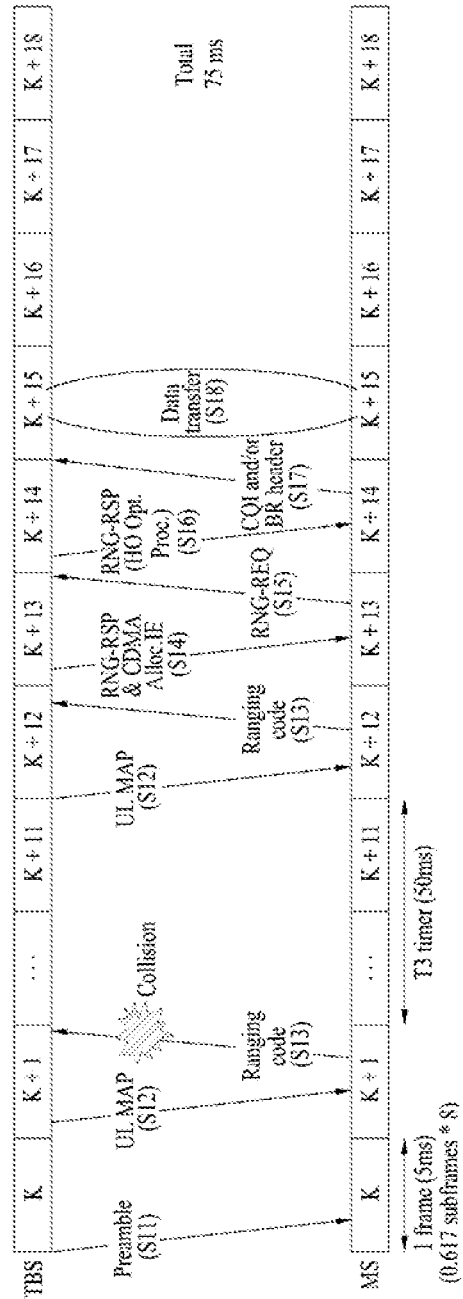
Figure 2A:
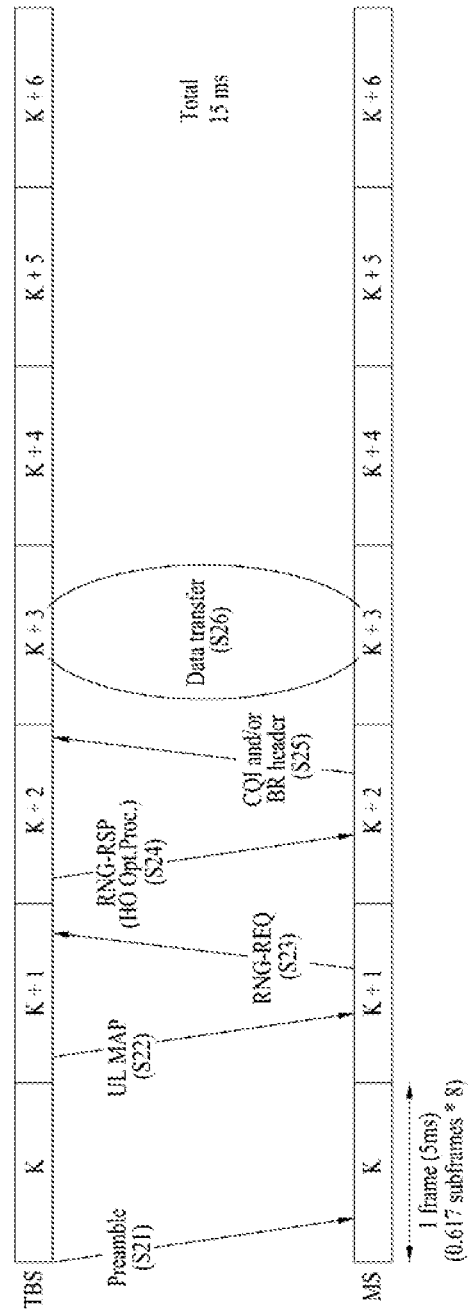
FIG. 2a and FIG. 2b are diagrams illustrating a ranging procedure during fast handover according to the related art.
Figure 2B:
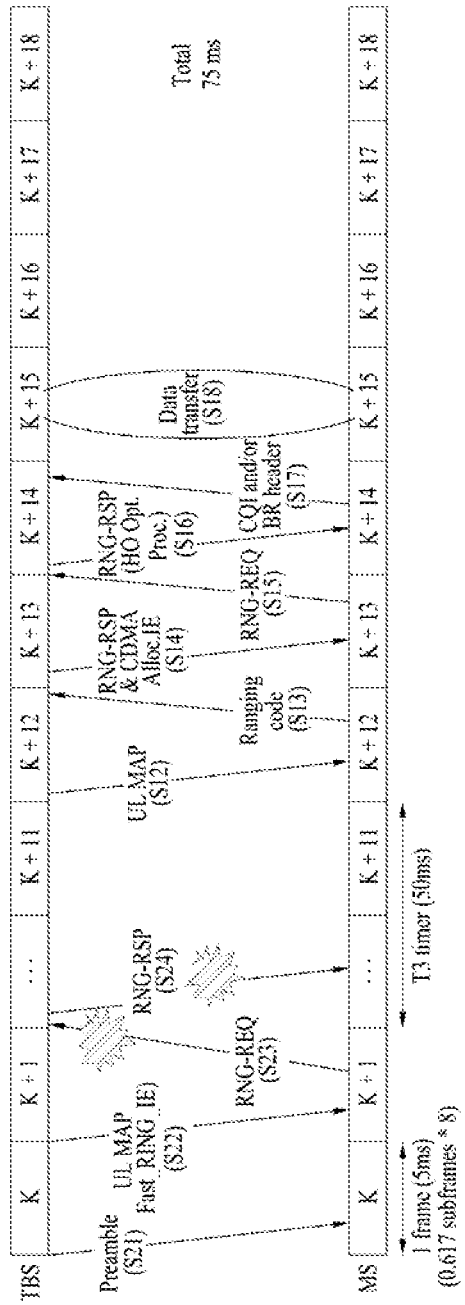

Hereinafter, the preferred embodiment of the present invention will be described with reference to the accompanying drawings.

The following embodiments are achieved by combination of structural elements and features of the present invention in a predetermined type. Each of the structural elements or features may be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as user equipment (UE) and mobile subscriber station (MSS).

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Specific terminologies hereinafter described are provided to assist understanding of the present invention, and various modifications can be made in the specific terminologies within the range that they do not depart from technical spirits of the present invention.

Hereinafter, various embodiments of the present invention will be described with reference to the accompanying drawings. However, some of basic procedures, which may make the subject matter of the present invention unclear, will be omitted to avoid unnecessary description.

Handover interruption time herein can mean the time between the time after a mobile station 100 transmits a message (for example, MOB_HO-IND)(hereinafter, referred to as 'target base station indication message') indicating that a serving base station 200 is determined as a target base station 300 (or the time after the mobile station 100 receives a response message (for example, HO_IND_RSP) to the target base station indication message) and the time when actual data transmission and reception can be performed as connection between the mobile station 100 and the target base station 300 is completed (see FIG. 3 to FIG. 6).

Hereinafter, various embodiments for reducing the aforementioned handover interruption time will be described with reference to the accompanying drawings.

Figure 3:
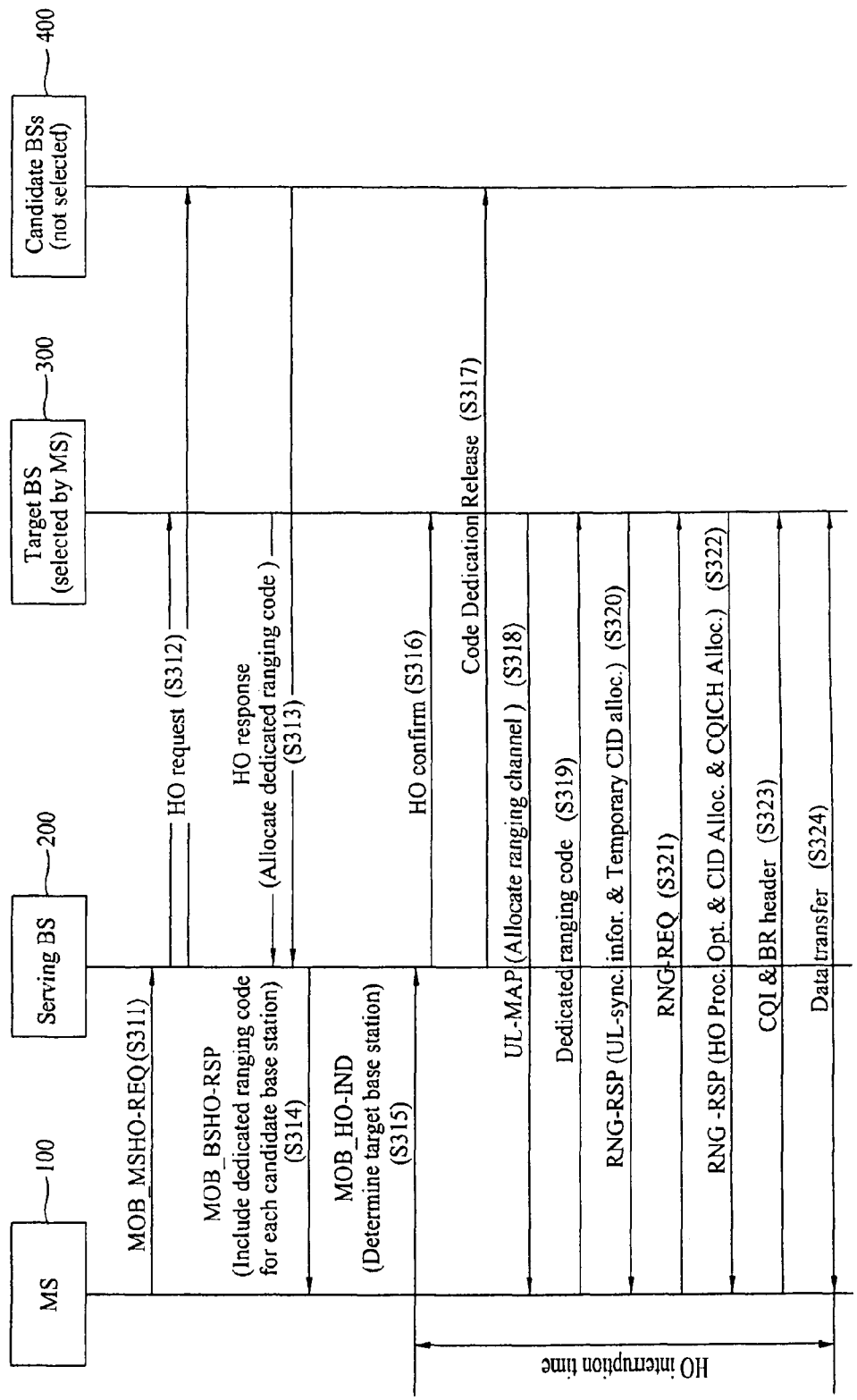
FIG. 3 to FIG. 8 are flow charts illustrating a method for reducing handover interruption time in a mobile station in accordance with one embodiment of the present invention.

First of all, the first embodiment for reducing the handover interruption time will be described with reference to FIG. 3. FIG. 3 illustrates a method for reducing handover interruption time as the serving base station 200 previously receives a dedicated ranging code from each of candidate base stations 300 and 400 and reports the received dedicated ranging codes to the mobile station 100 using a handover response message.

As illustrated in FIG. 3, the mobile station 100 transmits a handover request message (for example, MOB_MSHO-REQ) to the serving base station 200 (S311). By receiving the handover request message from the mobile station 100, the serving base station 200 transmits the handover request message to each of the candidate base stations 300 and 400 through a backbone (S312), and receives a response message from each of the candidate base stations 300 and 400 in response to the handover request message (S313).

The response message received from each of the candidate base stations 300 and 400 in step S313 includes a dedicated ranging code dedicatedly allocated from each of the candidate base stations 300 and 400 to the mobile station 100 which has requested handover, and can include dedicated effective interval information of the dedicated ranging code as the case may be. In this case, the dedicated effective interval is an interval where a corresponding ranging code can be used dedicatedly, and can be designated by a frame number.

A method for allocating a dedicated ranging code from the candidate base stations 300 and 400 will be described in detail later.

The serving base station 200 stores the dedicated ranging code or the dedicated effective interval information received from each of the candidate base stations 300 and 400, and can include the stored dedicated ranging code or dedicated effective interval information in a handover response message (for example, MOB_BSHO-RSP) to be transmitted to the mobile station 100.

Accordingly, the mobile station can obtain the dedicated ranging code or the dedicated effective interval information allocated from the candidate base stations 300 and 400 by receiving the handover response message from the serving base station (S314).

The mobile station 100 determines the target base station 300 from the candidate base stations 300 and 400 which have allocated the dedicated ranging code thereto, and transmits a message (for example, MOB_HO-IND) (hereinafter, 'target base station indication message') indicating that the target base station 300 has been determined to the serving base station 200 (S315).

The handover interruption time can start from the time when the target base station indication message is transmitted.

The serving base station 200 can transmit a handover confirmation message to the target base station 300 through the backbone by receiving the target base station indication message (S316), and can transmit a dedicated ranging code release message to the candidate base stations 400 excluding the target base station 300 (S317). Accordingly, the candidate base stations 400 which have received the dedicated ranging code release message can release the dedicated ranging code allocated to the mobile station 100 and allocate the dedicated ranging code to another mobile station.

The mobile station 100 can transmit the dedicated ranging code allocated from the target base station 300 during the ranging procedure with the target base station 300 (S319), and can perform the ranging procedure (S318 to S319) using the dedicated ranging code. At this time, the mobile station 100 can use a dedicated ranging code allocated within a frame corresponding to the dedicated effective interval information if the dedicated effective interval information is provided thereto.

Figure 4:
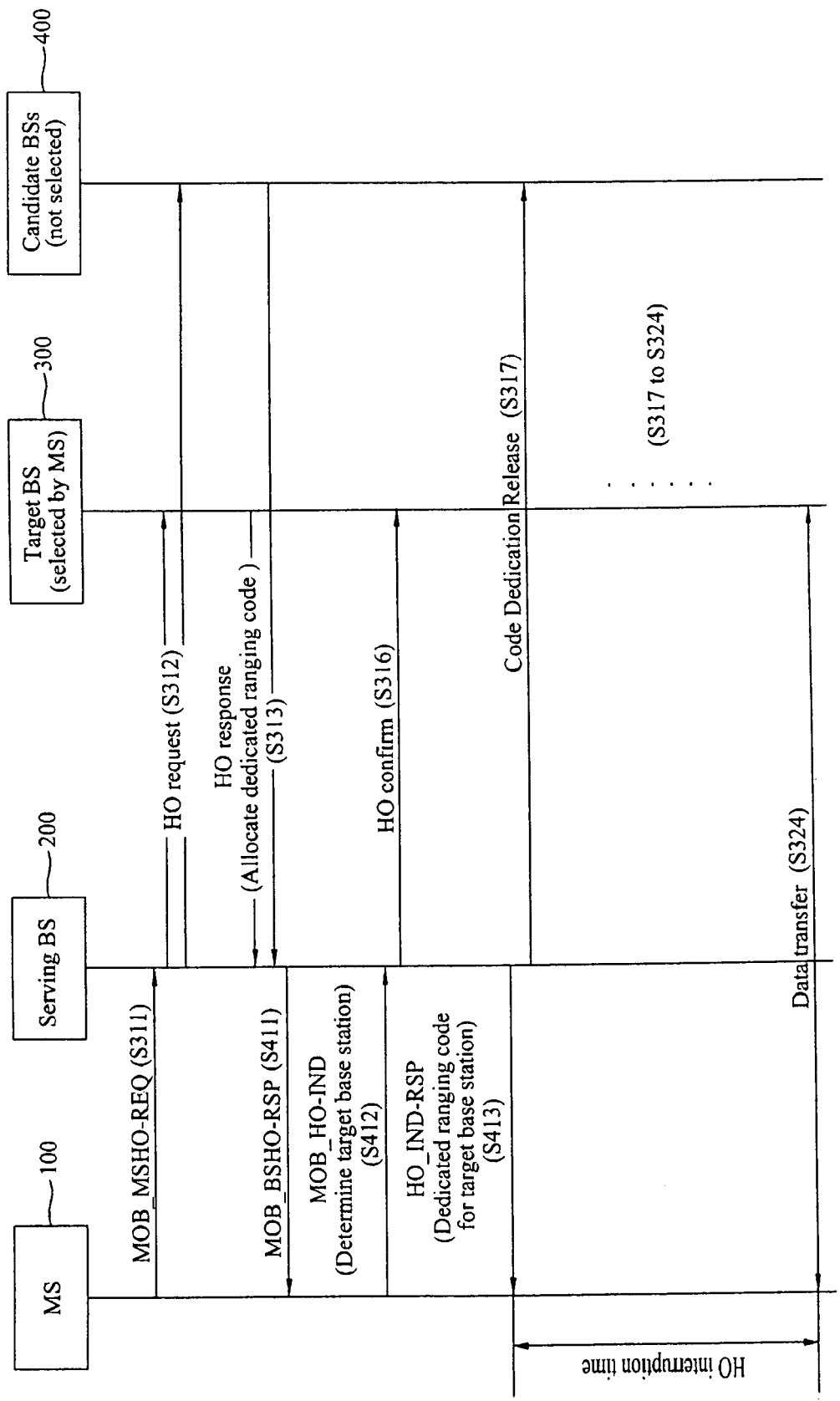

Next, the second embodiment for reducing the handover interruption time will be described with reference to FIG. 4. FIG. 4 illustrates a method for reducing handover interruption time as the serving base station 200 previously receives a dedicated ranging code from each of candidate base stations 300 and 400 and reports the received dedicated ranging codes to the mobile station 100 using a response message to a target base station indication message.

The steps S311, S312 and S313 of FIG. 3 are equally illustrated in FIG. 4. Accordingly, their detailed description will be replaced with the description of FIG. 3.

The mobile station 100 receives a response message (for example, MOB_BSHO-RSP) (hereinafter, referred to as 'handover response message') from the serving base station 200 in response to a handover request message (S411).

In this case, the handover response message can include information indicating the candidate base stations 300 and 400 recommended as a target base station by the serving base station 200. Accordingly, the mobile station can determine the target base station from the candidate base stations 300 and 400 recommended by the serving base station 200. Of course, another base station which is not recommended by the serving base station 200 may be used as the target base station.

The mobile station 100 determines the target base station 300 from the candidate base stations 300 and 400 and transmits a message (for example, MOB_HO-IND) (hereinafter, referred to as 'target base station indication message') indicating that the target base station 300 has been determined to the serving base station (S412).

The serving base station 200 can transmit a handover confirmation message to the target base station 300 through the backbone by receiving the target base station indication message (S316), and can transmit a dedicated ranging code release message to the candidate base stations 400 excluding the target base station 300 (S317).

Also, the serving base station 200 can select the dedicated ranging code allocated by the target base station 300 from the dedicated ranging codes for the respective candidate base stations 300 and 400, which are received in step S313, and can provide the selected ranging code to the mobile station 100.

The mobile station 100 receives a message, which includes the dedicated ranging code allocated from the target base station 300, from the serving base station 200 (S413). As the case may be, the message received in step S413 can include dedicated effective interval information of the dedicated ranging code. Accordingly, the mobile station 100 can obtain the dedicated ranging code allocated from the target base station 300 or its dedicated effective interval information. For example, the message received in step S413 may be a response message (for example, HO_IND-RSP) to the target base station indication message transmitted from the mobile station 100.

The handover interruption time can start from the time when the message is received in step S413.

The mobile station 100 can transmit the dedicated ranging code allocated from the target base station 300 during the ranging procedure with the target base station 300 (S319), and can perform the ranging procedure (S318 to S324) using the dedicated ranging code. Also, the mobile station 100 can perform the ranging procedure within a frame interval where the dedicated ranging code is effective if the dedicated effective interval information is received.

Figure 5:
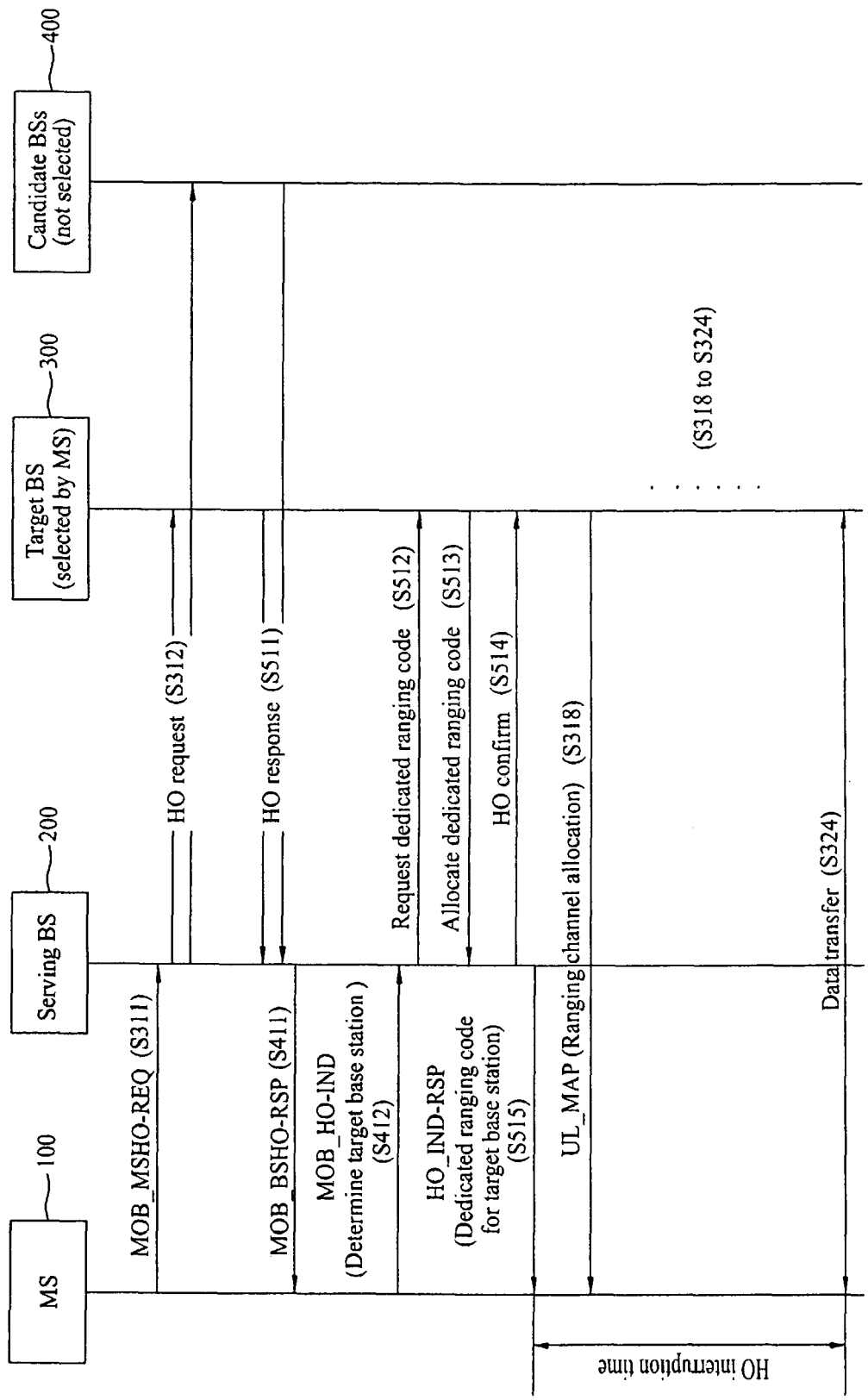

Next, the third embodiment for reducing the handover interruption time will be described with reference to FIG. 5. FIG. 5 illustrates a method for reducing handover interruption time as the serving base station 200 receives a dedicated ranging code from the target base station 300 after the target base station 300 is determined by the mobile station 100, and reports the received dedicated ranging code to the mobile station 100 using a response message to a target base station indication message.

The steps S311 and S312 of FIG. 3 are equally illustrated in FIG. 5. Accordingly, their detailed description will be replaced with the description of FIG. 3.

As illustrated in FIG. 5, by receiving a handover request message (for example, MOB_MSHO-REQ) from the mobile station 100, the serving base station 200 transmits the handover request message to each of the candidate base stations 300 and 400 through a backbone (S312), and receives a response message from each of the candidate base stations 300 and 400 in response to the handover request message (S313). At this time, it is noted that the response message to the handover request message does not include a dedicated ranging code.

The mobile station 100 receives a handover response message (for example, MOB_BSHO-RSP) indicating the candidate base stations 300 and 400 recommended as the target base station from the serving base station 200 (S411). The mobile station 100 determines the target base station 300 from the candidate base stations 300 and 400 and transmits a message (for example, MOB_HO-IND) (hereinafter, referred to as 'target base station indication message') indicating that the target base station 300 has been determined to the serving base station (S412).

The serving base station 200 can request the target base station 300 to allocate a dedicated ranging code of the mobile station 100 through a backbone (S512) by receiving the target base station indication message, and can receive a message, which includes the dedicated ranging code allocated to the mobile station 100 by the target base station 300, in response to the request (S513). As the case may be, the target base station 300 may allocate the dedicated effective interval of the dedicated ranging code along with the dedicated ranging code, and can provide information of the allocated dedicated effective interval to the mobile station 100 through the serving base station 200.

The mobile station 100 receives the dedicated ranging code allocated from the target base station 300 or a message, which includes the dedicated effective interval information of the dedicated ranging code, from the serving base station 200 (S515). For example, the message received in step S413 may be a response message (for example, HO_IND-RSP) to the target base station indication message transmitted from the mobile station 100.

The handover interruption time can start from the time when the message is received in step S515.

The mobile station 100 can transmit the dedicated ranging code allocated from the target base station 300 during the ranging procedure with the target base station 300 (S319), and can perform the ranging procedure (S318 to S324) using the dedicated ranging code.

Figure 6:
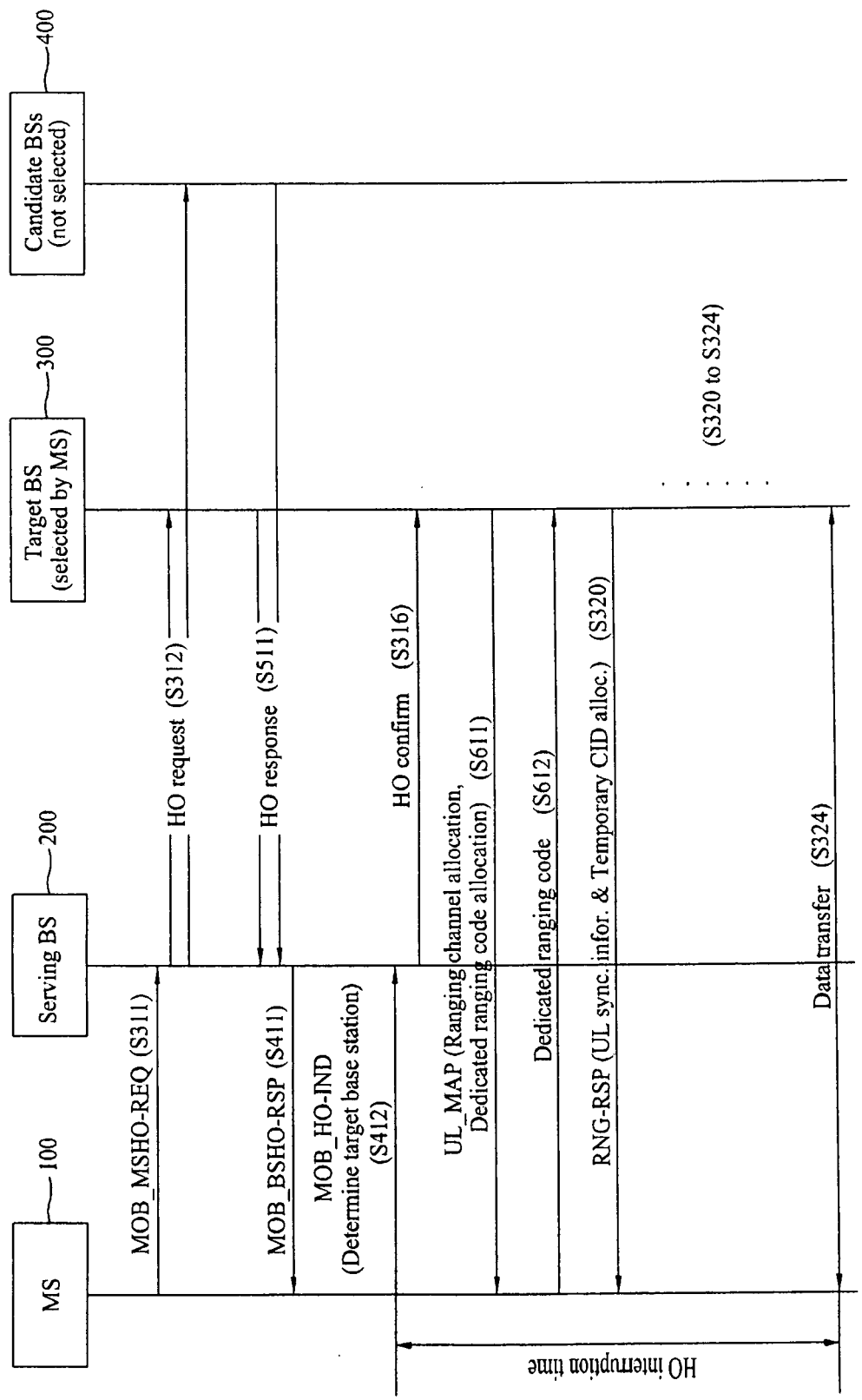

Next, the fourth embodiment for reducing the handover interruption time will be described with reference to FIG. 6. FIG. 6 illustrates a method for directly providing a dedicated ranging code from a target base station 300 to a mobile station 100 after the target base station 300 is determined by the mobile station 100.

The steps S311, S312, S511, S411, and S412 of FIG. 5 are equally illustrated in FIG. 6. Accordingly, their detailed description will be replaced with the description of FIG. 3 and FIG. 5.

By receiving a target base station indication message from the mobile station 100 (S412), the serving base station transmits a handover confirmation message to the target base station (S316).

The handover interruption time can start from the time when the message is received in step S412.

As the handover confirmation message is transmitted to the target base station 300, the ranging procedure between the mobile station 100 and the target base station 300 can be performed.

The mobile station 100 receives a message, which includes a dedicated ranging code allocated thereto by the target base station 300 (S611). For example, the dedicated ranging code can be provided through an uplink map, a data burst, or a broadcasting channel. In FIG. 6, the dedicated ranging code is provided through the uplink map (UL-MAP). As the case may be, the message received in step S611 can include dedicated effective interval information of the dedicated ranging code.

The mobile station 100 can transmit the dedicated ranging code included in the message received in step S611 to the target base station 300 (S612), and can perform the ranging procedure using the dedicated ranging code. Also, the mobile station 100 can perform the ranging procedure using the dedicated ranging code within the dedicated effective interval if the dedicated effective interval information of the dedicated ranging code is provided.

Figure 7:
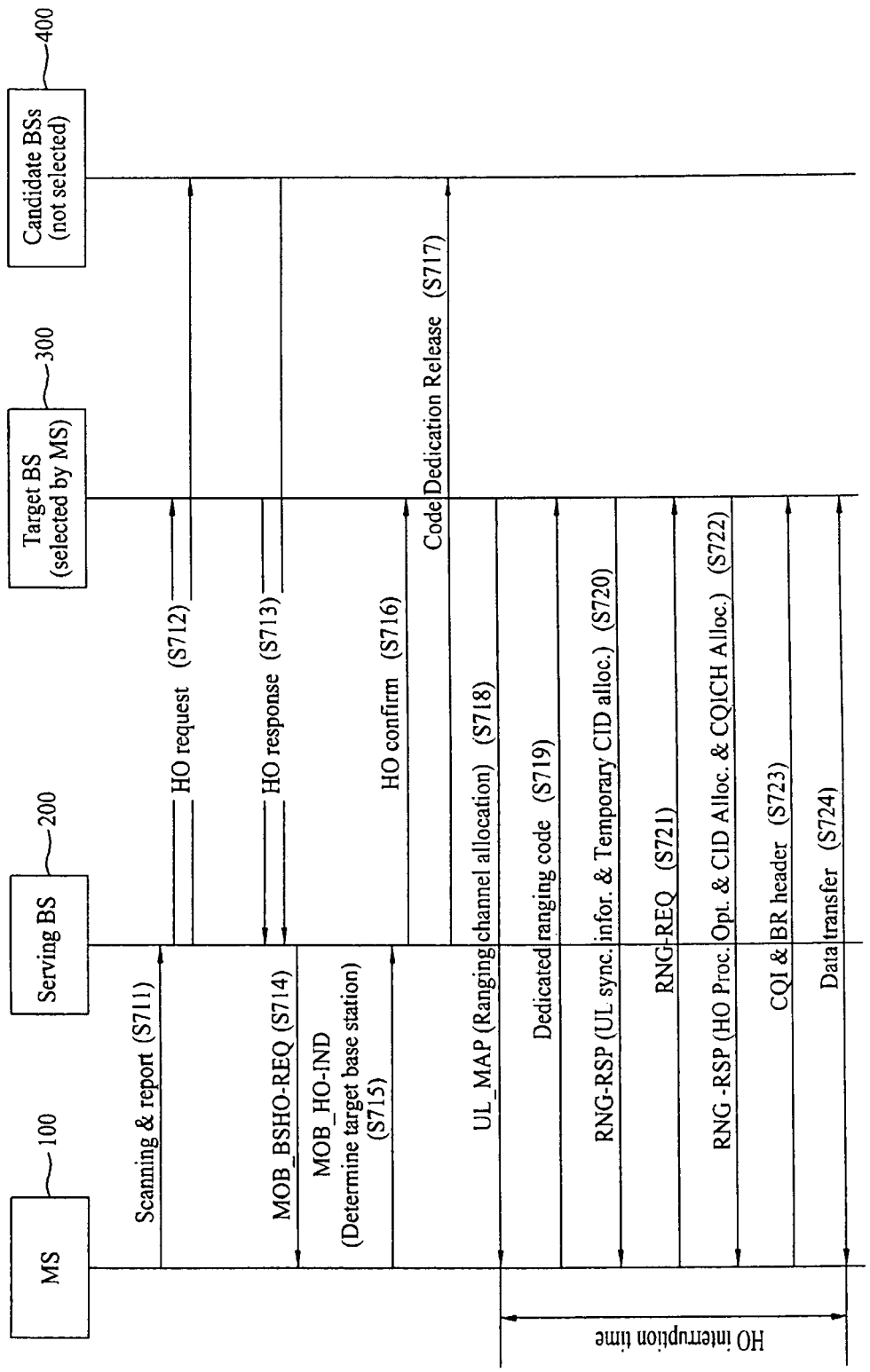

Next, the fifth embodiment for reducing the handover interruption time will be described with reference to FIG. 7. FIG. 7 illustrates a method for providing a dedicated ranging code to a mobile station 100 when handover is requested by a serving base station 200.

The embodiment of FIG. 7 is different from the aforementioned embodiments in that handover is requested by the serving base station 200. Accordingly, the first to fourth embodiments can be applied to the embodiment of FIG. 7 with reference to FIG. 3 to FIG. 6.

In the case that the first embodiment is applied to the embodiment of FIG. 7, the mobile station 100 can obtain a dedicated ranging code, which is allocated from each of candidate base stations 300 and 400, from the serving base station 200 through a handover request message (for example, MOB_BSHO-REQ) (S714). In this case, the serving base station can previously obtain the dedicated ranging code from each of the candidate base stations 300 and 400 by receiving a response message from the candidate base stations 300 and 400 in response to the handover request message.

Accordingly, the mobile station 100 determines the target base station 300 from the candidate base stations 300 and 400 which have allocated the dedicated ranging code, and then can perform the ranging procedure using the dedicated ranging code allocated from the target base station 300.

In the case that the second and third embodiments are applied to the embodiment of FIG. 7, the mobile station 100 can transmit a target base station indication message (for example, MOB_HO-IND) to the serving base station 200 (S715), and can receive a message, which includes the dedicated ranging code allocated from the target base station 300, from the serving base station 200 (not shown). In this case, the serving base station 200 may previously obtain the dedicated ranging code from each of the candidate base stations 300 and 400 before receiving the target base station indication message (S713), or may obtain the dedicated ranging code from the target base station 300 after receiving the target base station indication message (not shown).

Accordingly, the mobile station 100 can perform the ranging procedure using the dedicated ranging code allocated from the target base station 300.

In the case that the fourth embodiment is applied to the embodiment of FIG. 7, the mobile station 100 can directly obtain the dedicated ranging code from the target base station 300 using an uplink map during the ranging procedure (S718). Accordingly, the mobile station 100 can perform the ranging procedure using the obtained dedicated ranging code.

Figure 8:
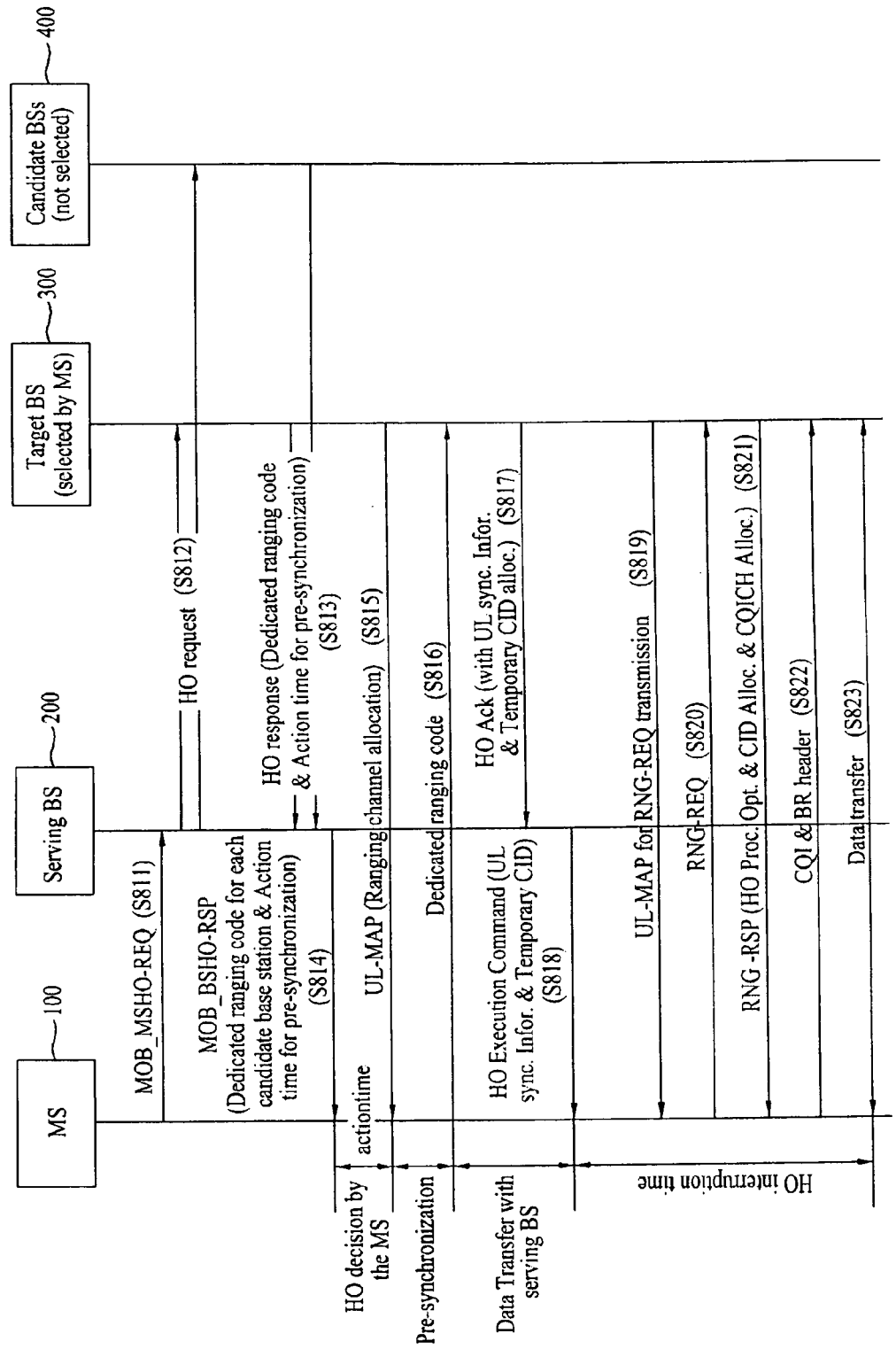

Next, the sixth embodiment for reducing the handover interruption time will be described with reference to FIG. 8. FIG. 8 illustrates a method for performing a pre-synchronization procedure before the handover interruption time.

As illustrated in FIG. 8, the mobile station 100 transmits a handover request message (for example, MOB_MSHO-REQ) to the serving base station 200 (S811). By receiving the handover request message from the mobile station 100, the serving base station 200 transmits a handover request message to each of the candidate base stations 300 and 400 through a backbone (S812), and receives a response message from each of the candidate base stations 300 and 400 in response to the handover request message (S813).

The response message received in step S813 includes the dedicated ranging code allocated from each of the candidate base stations 300 and 400 and action time information for the pre-synchronization procedure. As the case may be, the response message may include dedicated effective interval information of the dedicated ranging code.

A method for allocating the dedicated ranging code from each of the candidate base stations 300 and 400 will be described in detail later.

By receiving a handover response message (for example, MOB_BSHO-RSP) from the serving base station 200, the mobile station 100 can obtain the dedicated ranging code allocated thereto by each of the candidate base stations 300 and 400 and the action time information for the pre-synchronization procedure.

The mobile station 100 determines the target base station 300 from the candidate base stations 300 and 400 which have allocated the dedicated ranging code to the mobile station 100, and can perform the pre-synchronization procedure after the lapse of the action time for the pre-synchronization procedure.

During the pre-synchronization procedure, the mobile station 100 can be allocated with a ranging channel from the target base station 300 through the uplink map (S815), and can transmit the dedicated ranging code allocated by the target base station 300 to the target base station 300 (S816).

After the pre-synchronization procedure is completed, the mobile station 100 can transmit and receive data to and from the serving base station 200 by accessing the serving base station 200. And, the mobile station 100 can perform the ranging procedure (S819 to S823) with the target base station 300 using the dedicated ranging code by receiving a handover command message from the serving base station 200 (S818).

The handover interruption time can start from the time when the handover command message is received. As the pre-synchronization procedure is performed, predetermined steps (uplink map reception and ranging code transmission) of the ranging procedure can be omitted. Accordingly, the handover interruption time can be reduced.

As described with reference to FIG. 3 to FIG. 8, as the mobile station 100 performs the ranging procedure using the dedicated ranging code, collision of the ranging codes with another mobile station does not occur, whereby the handover interruption time can be reduced.

Furthermore, since the ranging procedure excluding the step of transmitting the dedicated ranging code in the drawings is identical with the ranging procedure according to the related art, its detailed description will be omitted. Moreover, although the general ranging procedure is illustrated in the drawings, it will be apparent that the ranging procedure can be applied to the fast ranging procedure.

Hereinafter, a method for allocating a dedicated ranging code from a target base station 300 of candidate base stations 300 and 400 to at least one mobile station which tries to perform handover for the target base station 300 will be described. Of course, the dedicated ranging code may be allocated from the candidate base stations 400 not the target base station 300 in accordance with the aforementioned embodiments.

The target base station 300 can allocate the dedicated ranging code using at least one of an uplink map (UL-MAP), a data burst, and system information signaling.

First of all, the case where the uplink map is used will be described.

The target base station 300 defines dedicated ranging code allocation information (for example, HO_Ranging_IE) in the uplink map, and can perform signaling by multiplexing dedicated ranging code information of all mobile stations which try to perform handover for themselves, through the defined ranging code allocation information.

Examples of the dedicated ranging code allocation information can include the number (N_HO_MS) of mobile stations which try to perform handover for themselves, mobile station identification information for identifying each mobile station (HO ID), MS MAC address, connection ID (CID), index of dedicated ranging code, transmission opportunity offset for designating code transmission opportunity in a common ranging channel, and information of dedicated ranging region allocation (ranging region using the dedicated ranging code).

Table 1 defines each information field included in the dedicated ranging code allocation information.

TABLE 1

| HO_Ranging_IE | Definition |
|---|---|
| N_HO_MS<br>Indicator(identification information)<br>Index of dedicated ranging code<br>Transmission opportunity offset<br>Information of dedicated ranging region<br>allocation | |

Alternatively, the target base station 300 can allocate the dedicated ranging code to each of all mobile stations which try to perform handover for themselves in a type of UL-MAP_IE in the uplink map.

Examples of the UL-MAP_IE can include mobile station identification information (HO ID), MS MAC address, dedicated ranging code index, transmission opportunity offset, and information of dedicated ranging region allocation.

Table 2 illustrates an example of the UL-MAP_IE.

TABLE 2

UL-MAP_IE{
HO ID(or MS MAC Address)
Index of dedicated ranging code
Transmission opportunity offset TABLE 2-continued Information of dedicated ranging region allocation
}

Next, the case where the data burst is used will be described below.

The target base station 300 defines a separate data burst (or message) for dedicated ranging code allocation, and can multiplex dedicated ranging code information of all mobile stations which try to perform handover for themselves, using one data burst and then multicast the multiplexed dedicated ranging code information to all mobile stations. In this case, broadcasting ID can be defined to designate the data burst for dedicated ranging code allocation.

Examples of the data burst for dedicated ranging code allocation can include the number of mobile stations which try to perform handover for themselves, size information of the data burst, mobile station identification information, index of dedicated ranging code, transmission opportunity offset, and information of dedicated ranging region allocation (ranging region using the dedicated ranging code).

Alternatively, the target base station 300 defines a separate data burst (or message) for dedicated ranging code allocation, and can provide the data burst to each of all mobile stations which try to perform handover for themselves. The position of each data burst can be designated by the map. The map can report the mobile station corresponding to each data burst through HO ID, MS MAC address, CID, etc.

Examples of the data burst for dedicated ranging code allocation can include mobile station identification information, index of dedicated ranging code, transmission opportunity offset, and information of dedicated ranging region allocation (ranging region using the dedicated ranging code).

Next, the case where system information signaling is used will be described below.

The target base station 300 can perform signaling for information of the dedicated ranging code through system information.

For example, the system information is information of the dedicated ranging code, and its examples can include the number of mobile stations which try to perform handover for themselves, mobile station identification information, index of dedicated ranging code, transmission opportunity offset, and information of dedicated ranging region allocation (ranging region using the dedicated ranging code).

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for reducing handover interruption time at a mobile station, the method comprising:
    transmitting a handover request message to a serving base station;
    receiving a handover response message from the serving base station that includes a dedicated ranging code of each of at least one candidate base station, wherein the handover response message further includes action time information for a pre-synchronization procedure and is related to the handover request message;
    receiving an uplink-MAP including a ranging channel allocation from a target base station after lapse of an action time for the pre-synchronization procedure indicated by the action time information;
    transmitting a dedicated ranging code to the target base station during the pre-synchronization procedure, wherein the dedicated ranging code is allocated by the target base station; and
    performing, after the pre-synchronization procedure, a ranging procedure with the target base station by using the dedicated ranging code, if a handover command message, from the serving base station, is received.

2. The method of claim 1, wherein the handover response message further includes dedicated effective interval information of the dedicated ranging code.

* * * * *